(12) United States Patent
Merritt et al.

(10) Patent No.: US 11,348,038 B2
(45) Date of Patent: May 31, 2022

(54) OMNICHANNEL GOLF COMMUNICATIONS SYSTEM

(71) Applicant: GolfPay, LLC, Scottsdale, AZ (US)

(72) Inventors: Dale Merritt, Scottsdale, AZ (US); Brian Tompsett, Scottsdale, AZ (US)

(73) Assignee: GolfPay, LLC, Scottsdale, AZ (US)

( * ) Notice: Subject to any disclaimer, the term of this patent is extended or adjusted under 35 U.S.C. 154(b) by 198 days.

(21) Appl. No.: 16/230,372

(22) Filed: Dec. 21, 2018

(65) Prior Publication Data

US 2020/0202258 A1 Jun. 25, 2020

(51) Int. Cl.
| | | |
|---|---|---|
| *G06Q 10/02* | (2012.01) | |
| *G06Q 20/38* | (2012.01) | |
| *G06Q 20/10* | (2012.01) | |
| *G06Q 30/06* | (2012.01) | |
| *A63B 102/32* | (2015.01) | |

(52) U.S. Cl.
CPC .......... *G06Q 10/02* (2013.01); *G06Q 20/102* (2013.01); *G06Q 20/38* (2013.01); *G06Q 30/0601* (2013.01); *A63B 2102/32* (2015.10)

(58) Field of Classification Search
CPC ...... G06Q 10/02; G06Q 20/102; G06Q 20/38; G06Q 30/0601; A63B 2102/32
See application file for complete search history.

(56) References Cited

U.S. PATENT DOCUMENTS

| | | | | |
|---|---|---|---|---|
| 7,953,617 | B2 * | 5/2011 | Smeenge | G06Q 10/02 705/5 |
| 8,806,350 | B2 * | 8/2014 | Krishnan | H04L 67/22 715/747 |
| 2003/0040946 | A1 * | 2/2003 | Sprenger | G06Q 30/06 705/6 |
| 2003/0233311 | A1 * | 12/2003 | Bramnick | G06Q 30/08 705/37 |
| 2007/0260495 | A1 * | 11/2007 | Mace | G06Q 10/02 705/5 |
| 2007/0260510 | A1 * | 11/2007 | Chrzan | G06Q 30/0239 705/14.19 |
| 2008/0108456 | A1 * | 5/2008 | Bonito | A63B 71/06 473/409 |
| 2009/0070249 | A1 * | 3/2009 | Leach | G06Q 30/02 705/37 |

(Continued)

OTHER PUBLICATIONS

Cirillo, Rich, "A Hole In One—Web integrator Emerald Solutions drives in a winner, creating an online reservation system with both B2B and B2C applications for Greens.com," VAR Business, CMP Media Inc., 46, Apr. 3, 2000.*

*Primary Examiner* — Nathan Erb

(74) *Attorney, Agent, or Firm* — Fennemore Craig, P.C.

(57) ABSTRACT

A golf communications system utilizes an interactive voice response system to facilitate user-selected omnichannel communications options among a community of golfers. The communications options include booking tee times, allocation of payments among a group of golfers, virtual pro shop communications, and ecommerce subscriptions. The various channels may include email, text, VoIP communications, Internet chatrooms, and/or Internet messaging services. The system fully automates reception of input from one or more golfers for purposes of booking tee-times, distributing communications among a plurality of golfers, and making transactions.

15 Claims, 9 Drawing Sheets

(56) References Cited

U.S. PATENT DOCUMENTS

| | | | |
|---|---|---|---|
| 2009/0210263 A1* | 8/2009 | Smeenge | G06Q 10/02 705/5 |
| 2011/0250939 A1* | 10/2011 | Hobler | G09F 27/00 463/7 |
| 2013/0116058 A1* | 5/2013 | Waddell | A63B 69/36 473/131 |
| 2013/0242807 A1* | 9/2013 | Altberg | H04M 15/09 370/259 |
| 2013/0290041 A1* | 10/2013 | Harley | G06Q 10/1093 705/5 |
| 2013/0316735 A1* | 11/2013 | Li | H04W 4/029 455/456.3 |
| 2014/0025766 A1* | 1/2014 | Beck | G06Q 10/107 709/206 |
| 2014/0052707 A1* | 2/2014 | Jindra | G06F 16/951 707/707 |
| 2014/0289249 A1* | 9/2014 | Davis | H04L 51/14 707/737 |
| 2014/0293807 A1* | 10/2014 | Devolites | H04L 12/1482 370/252 |
| 2015/0032535 A1* | 1/2015 | Li | G06Q 30/0255 705/14.53 |
| 2015/0058235 A1* | 2/2015 | Kahan | G06Q 50/01 705/319 |
| 2015/0134402 A1* | 5/2015 | Barbieri | G06Q 50/01 705/7.29 |
| 2015/0248651 A1* | 9/2015 | Akutagawa | G06Q 50/01 705/7.19 |
| 2016/0012465 A1* | 1/2016 | Sharp | G06Q 20/384 705/14.17 |
| 2016/0170998 A1* | 6/2016 | Frank | H04W 4/021 707/748 |
| 2016/0210602 A1* | 7/2016 | Siddique | G06Q 10/0637 |
| 2016/0328478 A1* | 11/2016 | Jindra | G06Q 30/06 |
| 2017/0109757 A1* | 4/2017 | Tuchman | G06Q 30/01 |
| 2017/0262943 A1* | 9/2017 | Akutagawa | G06Q 30/0201 |
| 2018/0108010 A1* | 4/2018 | McHale | G06Q 30/0283 |
| 2018/0158149 A1* | 6/2018 | Straub | G06Q 10/1095 |
| 2018/0253464 A1* | 9/2018 | Kohli | G06F 16/219 |
| 2018/0285827 A1* | 10/2018 | Dotan-Cohen | G06Q 10/1095 |
| 2019/0244265 A1* | 8/2019 | Van Sant | G06Q 20/322 |
| 2019/0306107 A1* | 10/2019 | Galbraith | G06F 9/547 |
| 2019/0392007 A1* | 12/2019 | Jindra | G06F 16/9535 |
| 2020/0074406 A1* | 3/2020 | Culver | G06Q 10/067 |

\* cited by examiner

OMNICHANNEL GOLF COMMUNICATIONS SYSTEM

STATEMENT OF THE PROBLEM

Field of the Invention

The presently disclosed instrumentalities pertain to a computer network that assists golfers in making tee time reservations. More particularly, the network improves the golfing experience by facilitating communications among a group of golfers together with the golf course management.

Description of the Related Art

Golf course tee-time management software is commercially available from services such as that provided by GolfSwitch, Inc. of Scottsdale, Ariz. Systems having tee-time management functionality have been patented, such as the system described in United States Patent Publication 2008/0120157 to Foster. This system hosts a data service that manages the tee sheets of a plurality of participating golf courses. The system also manages payment of associated fees. United Sates Patent Publication 2014/010868 describes a system that does much the same thing, but generates a geographical map having location indicators of participating golf courses.

Despite this technical availability to provide online booking systems being known to the art, the National Golf Club Owners Association has published a study indicating, nonetheless, that only a small percentage of tee time are booked using online services. This happens even though almost all golf course owner/operators use software to manage their tee sheets. This happens even though many of the tee sheet software companies have proprietary third party websites that they operate as third party booking agents for multiple golf courses.

Most bookings occur in person or by telephone. It turns out that most golfers do not use the available booking sites because they have been poorly designed. These sites cannot resolve, for example, situations where a desired tee time is unavailable and the golfers in a party need to confer to decide upon the next best time. There are also problems with synchronicity between databases at the third party booking agent and those of the golf course, such that the two databases are not kept current with one another in real time concerning available tee-time and pricing information. Also, golf course operators are concerned about losing touch with their customers if the system is too automated, since this creates a barrier to the customer experience of interacting with the pro shop in a normal manner. Lastly, a number of different entities are involved in the online booking transactions, where the crossing of boundaries between successive entities requires a sufficient amount of effort that and so also creates a barrier to use.

SOLUTION

The presently disclosed instrumentalities advance the art and overcome the problems outlined above by simplifying the process of tee time bookings through use of an integrated golf communications system that expedites the automated booking process by use of an integrated system which is easy to use. The integrated system permits a group of golfers to book tee times online while communicating among themselves about various options, and then makes it easy for each golfer to pay an allocated share of the associated fees. Addressing the concern of losing touch with customers, the system also provides a virtual pro shop that provides access to the information and services normally rendered by a pro shop at a golf course. The users may also subscribe to an ecommerce service that provides golf-related offers of products and services.

Use of an online system that was built according to the instrumentalities described below confirms a significant advance in the art. Use of the system in practice results in a substantial increase of overall tee-time bookings being exclusively performed online. In addition to the system functionalities being integrated into a single service or system, the use of omnichannel communications constitutes a considerable advance. By way of example, an older golfer may not want to bother with communication channels including email or Internet communications and may prefer, instead, to communicate by voice. Other golfers who are more comfortable with technology options, especially younger golfers, may wish to communicate using channels of email, text (Short Message Service or SMS), or an Internet messaging service.

The foregoing advantages flow from an interactive voice response (IVR) system that is able to interpret voice messaging and/or user selection of menu options. This replaces, for example, voice mail as a way to capture tee time reservations when the course is closed or when golf course is busy. The system also facilitates payments and purchases. This compares to current arrangements where most golf courses have their phone lines go into a voice mail when the course Is closed or staff is busy. The current system may capture reservations at night, without the need for the customer to have an internet connection. The IVR offers tee time reservations, communications, and payments all of which may be automated for use on various channels including text message, webchat, VoIP voice communications, and Facebook messenger according to user selected preferences.

In one aspect, the IVR works using one or more URLs and telephone numbers that are assigned to a specific golf course. Golfers access the IVR through the number or URL which communicates to golfers using the various channels described above. Golfers may select their channels to make purchases, for automated booking of tee times, to communicate with one another, to subscribe to ecommerce opportunities, and even make purchases via text or by interacting with the IVR.

In one aspect, the system allows golfers to do split payments, so any golfer in the group can pay for any other golfer(s), all online.

In one aspect, the system may automate the process of golf courses selling memberships to golfers, and this may be integrated with an automated online tee time reservation process. Thus, golfers can simultaneously book a tee time, purchase the membership card, and get those benefits immediately.

In one aspect, the system may automate the building of a club database. When a golfer calls into the golf course, the golfer an option to add the golfer's mobile number or email to the database for the golf course. The golfer will then receive a text message or email through which the golfer can complete the transfer of information for registering as a user with the system.

According to one embodiment, a cloud communications service gateway is provided to send and receive messages with omnichannel capability. In essence, the cloud communications server functions as a protocol translator to facilitate user communications with a central server using any of the aforementioned channels.

According to one embodiment, the golf communications system includes a plurality of networked devices that are operably configured with program instructions for golfer-selectable omnichannel communications options facilitating, in combination, golf tee time reservations, golf-related ecommerce subscriptions, communications among a party of golfers, and payments arising from user interaction with the system. The network permits these system functionalities be accessed contemporaneously or simultaneously from a user perspective, for example, such that a golfer who is making a tee time reservation may communicate with members of the golfing group to receive their preferences for booking options that include the date, time of day and payment options.

In one aspect, the golf communications system may facilitate communications among a plurality of golfers that are classified by association as a group. The program instructions for tee time reservations permit a group representative to simultaneously reserve a tee time for a plurality of members of the group. In another aspect, the program instructions for payment may include program logic for allocating payments that are incurred as a result of reserving the tee times to individual golfers associated with the group. The payments may be allocated equally or unequally among all of the individuals associated with the group. In yet another aspect, the program instructions of the golf communications system may be executed simultaneously from a user perspective to provide for golf tee time reservations being assisted by communications among a party of golfers as the reservations are being made. The program instructions then provide for distributing to the group payment invitations that may be concluded before the tee time is finally booked.

In one aspect, the program instructions for golf tee time reservations and for communications among a party of golfers provide a plurality of user-selectable omnichannel communications options where the channels include any combination of email, Voice-Over-Internet Protocol (VoIP), text messaging (SMS), and an Internet messenger protocol.

In one aspect, the golf communications system may include a gateway that processes communications from the plurality of channels in coordination with a central server. The gateway converts messages from the plurality of channels in their various data protocols into a unified format that is sent to the central server. The gateway may be, for example, a communications server operably configured to convert VoIP, email, and/or SMS messages into a flat text file.

In one aspect, each individual user of golf communications system may specify a preference to receive messaging through use of one of the channels or a plurality of the channels.

In one aspect, the foregoing instrumentalities may be accessed through use of an application program interface (API) that resides on a mobile device or a desktop computer. The API is operably configured for input/output transactions facilitating use of the program logic including the golf tee time reservations (a), the golf-related ecommerce subscriptions (b), the communications among a party of golfers (c); and payments (d). Use of this API, which facilitates omnichannel communications according to user preferences, significantly improves the golfer experience in booking tee times and interacting with the pro shop of a golf course.

In one aspect, the system functionality of ecommerce transactions may emphasize golf-related merchandise or services, such as golf equipment, golf vacations, golf lessons, cars of interest to golfers, and dining at restaurants located near golf courses, as well as attendance at professional tournaments and other travel. Golfers may indicate a preference to receive ecommerce offerings, or not to receive them at all. The revenues received from the ecommerce system functionality, as well as reducing the number of employees available to book tee times, make it possible to offer access to the golf communications system at a reduced cost or for free to the user.

DETAILED DESCRIPTION

Figure 1:
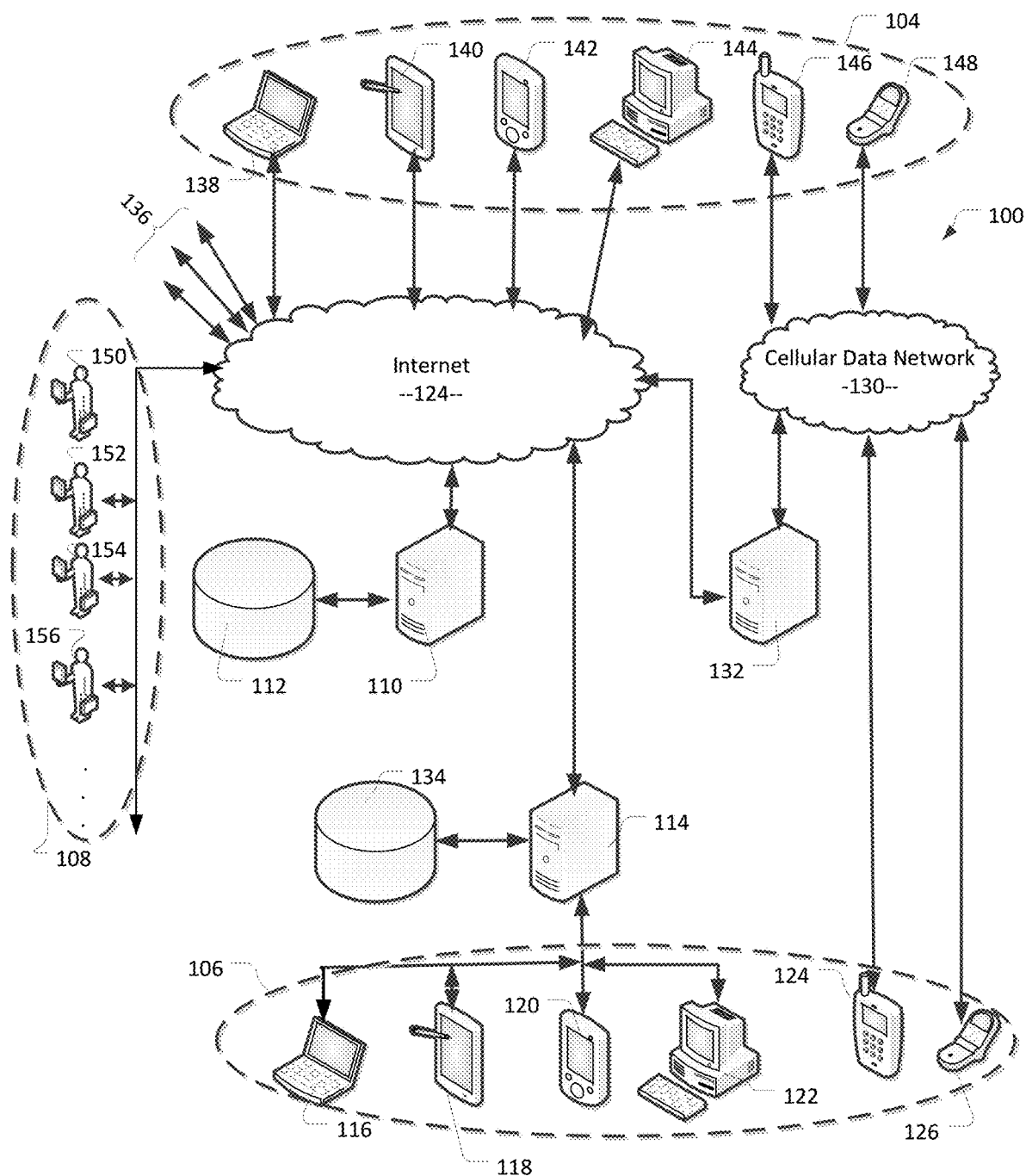
FIG. 1 is a network diagram showing structure of the golf course communications system according to one embodiment.

There will now be shown, by way of nonlimiting example, a golf communications system that practices the foregoing instrumentalities. FIG. 1 shows this as golf communications system 100, which provides communications between a golfer user community 104, a golf service provider user community 106, and a vendor community 108. A central server 110 accesses a master database 112 to govern communications on the system 100. As shown in FIG. 1. A golf course server 114 contains a servlet program automating channel-appropriate communications between the service provider community 106 and the central server 110. Accordingly, individual golf service provider users may opt to use any number of devices, such as a laptop computer 116, a tablet computing device 118, a personal digital assistant 120, or a desktop computer 122. These devices may be configured to communicate with the golf course server 114, such as by utilizing a Local Area Network, Bluetooth or other wireless communications as are known to the art. These communications pass through the Internet 124 to the central server 110 and back to the laptop computer 116, tablet computing device 118, personal digital assistant 120, or desktop computer 122. There may be any number of individual users in the golf course user community 106 and any number and type of device.

Other devices, such as a smartphone 126 or a cellular phone 128, communicate over a cellular data network 130 with a cloud communications service 132, such as Twilio™ of San Francisco, Calif. This service converts sound communications, such as voice and dial tones, to text messages that are forwarded through the Internet 124 utilizing the central server 110 and the cloud communications service 132 to communicate with users operating the smart phone 126 or the cellular phone 128.

The golf course server 114 maintains a golf course database 134 in periodic synchronicity with the master database 112 as to all data pertaining to a particular golf course. Any number of additional gold courses may be connected with the central server 110 utilizing communication links 136, with the master database 112 serving as a master data repository for all system data for all golf courses, such data being maintained in synchronicity with golf course servers (not shown) for each golf course.

The golfer use community 104 is similarly provide with omnichannel communications devices, such as laptop 138, tablet 140, PDA 142, and desktop 144 communicating with the golf course server 114 over the Internet 124, as well as smartphone 146 and cellular phone 148 communicating with the golf course server 114 using the cloud communications service 140 and the Internet 124.

The system 100 also communicates with a vendor community 108 including any number of vendors 138, 140, 142, 144. These vendors may be, for example, companies that specialize in selling golf equipment, restaurants that cater to golfers, golfing vacation packages, or any other products or services of interest to golfers. Individual vendors of the vendor community 108 may utilize the golf communications system 110 to send promotions and other information to the golfer user community 104 and/or the golf course user community 106. Thus, a single ecommerce subsystem on the system 100 may deliver either retail communications to the golfer user community 104 or wholesale communications to the golf service provide user community 106. Preferably but optionally, these communications are delivered only to users of the user communities 104, 106 who subscribe to receiving information from the vendor community 108. The promotional offers and information may be provided to a single golf course or multiple golf courses using communications links 136. The promotional offers and information may be offered through a transactional email service, such as Send-Grid of Denver, Colo.

The vendor community 108 also includes midlevel vendors that facilitate transactions which are conducted through the system 100. These include vendors who integrate payment processing, such as the CardConnect® service provided Financial Transaction Services, LLC or CardConnect LLC, both of King of Prussia, Pa. or another similar service, as well as a tee-time booking engine such as GolfSwitch™ provided by GolfSwitch, Inc. of Scottsdale, Ariz. or another similar booking engine.

The omnichannel aspect of the foregoing system 100 permits advantageous flexibility in facilitating user choices among the respective options for device options. By way of example, a majority of tee times are currently booked using voice communications with the pro shop off a golf course. The ensuing delays in these communications at key times are a significant frustration of many golfers. The system 100 advantageously permits golfer users to use voice communications for automated booking of tee times, even while the pro shop of a particular golf course is not open. While the demand for this channel may be desired mostly by older golfers, younger golfers may desire to use other channels such as email, Internet messaging services, texting and the like.

Figure 2:
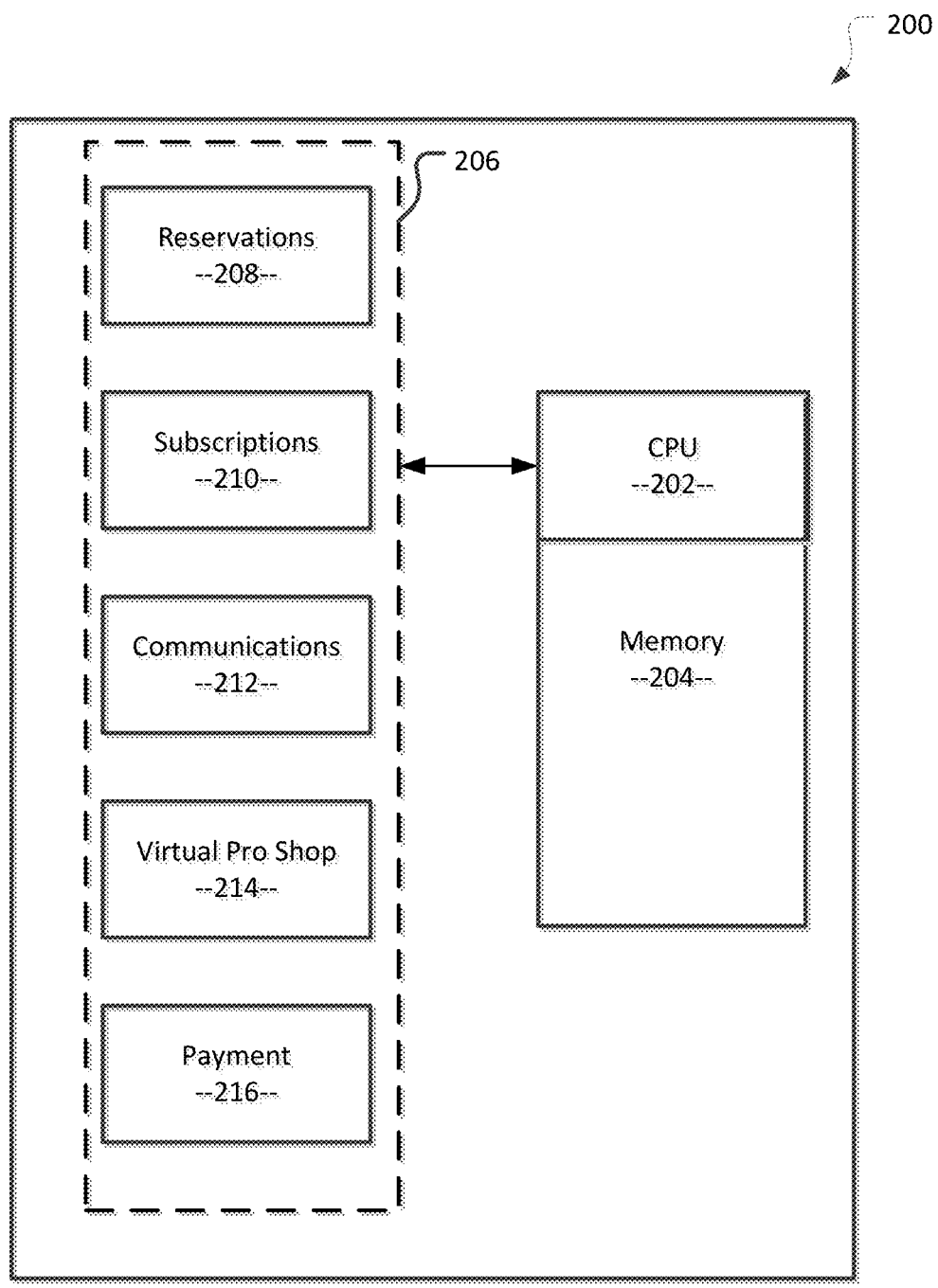
FIG. 2 shows a mobile device configured with an API that facilitates user input and output operations as part of the golf communications system.

FIG. 2 shows a user device 200 that operates using a processor 202 and memory 204 configured to run program logic as an application program interface (API) 206. The API 206 is the user interface that provides interaction with functionalities of the system 100, as implemented using program logic described below. The API 206 provides input/output for user interaction with other program logic that provides functionalities of the system 100 including tee-time reservations 208, e-commerce subscriptions 210, other communications 212, virtual prop shop 214 and payment processing 216. The user device 200 may be any of the omnichannel communications devices previously described, such as laptop 138, tablet 140, PDA 142, and desktop 144 smartphone 146 and cellular phone 148.

Figure 3:
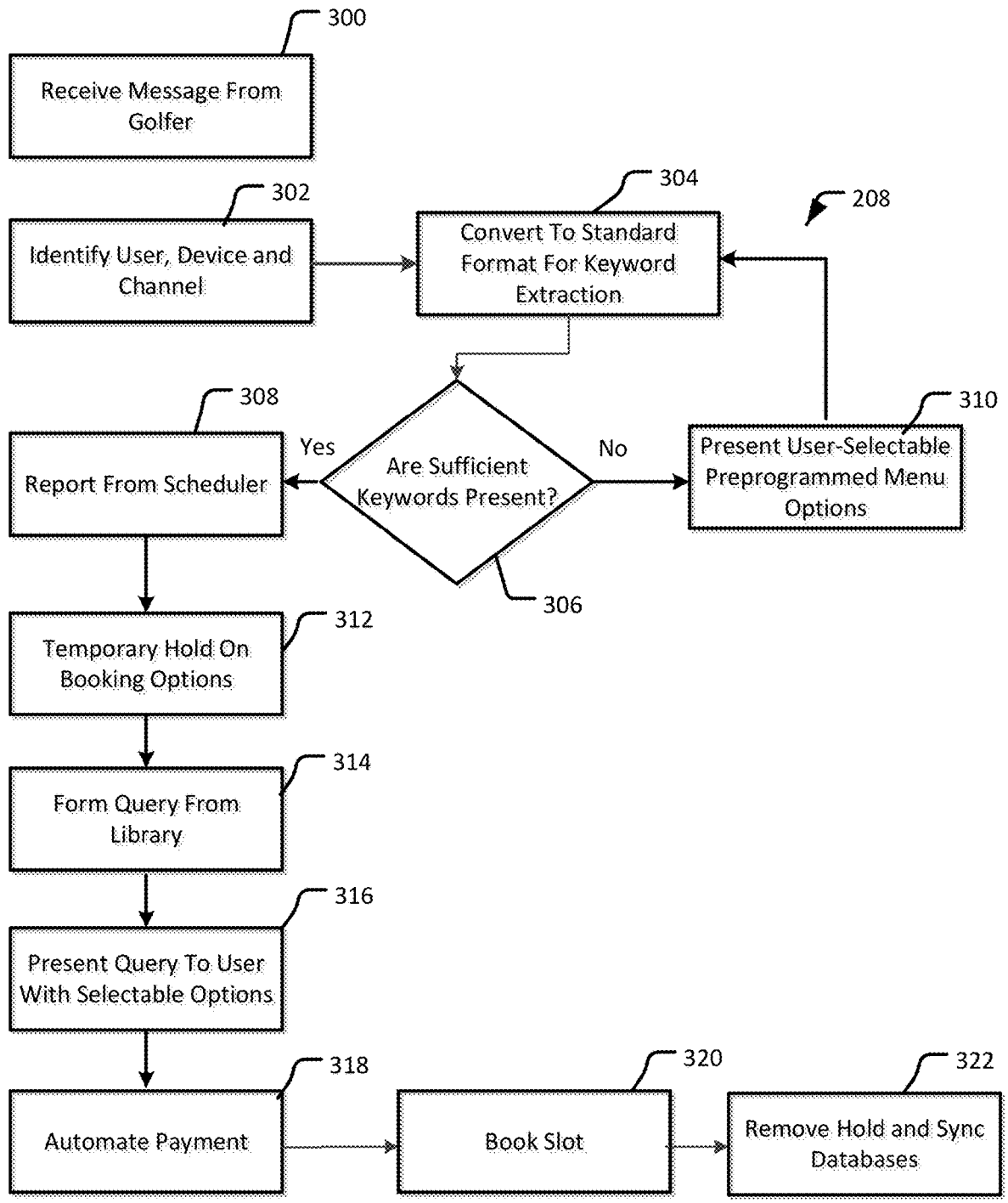
FIG. 3 is a flowchart of logic for program instructions providing a system functionality of booking a tee time.

FIG. 3 shows program logic for the reservations functionality 208 that may, for example, be programmed to reside on the central server 110. Receiving a message from a golfer 300 is followed by identifying 302 the user, the device, and the channel of communication. The device may be determined by a flag that is set by the API 206 to identify the type of device, whether this is the laptop 138, tablet 140, PDA 142, desktop 144, smartphone 146 or cellular phone 148. The API 206 also transmits a USERID that identifies a specific golfer. As used herein, channels are communications format options that may be utilized on a type of device omni-channel modality. For example, a person may utilize a channel as email, Voice-Over-IP (VoIP), text messaging (Short Message Service or "SMS"), or an Internet messenger service (e.g. Facebook Messenger™) using any of the devices including laptop 138, tablet 140, PDA 142, desktop 144, or smartphone 146. Use of the cellular phone 148 will be limited to voice and dial tone channels because cellular phones that are not smartphones lack email capability; however, it remains possible to convert voice to text and vice-versa using for example the Twilio™ service mentioned above or a similar commercially available service. The message is converted 304 to a standard format for use in keyword extraction. For voice messaging, this may entail voice conversion to text. For other messages, this may entail separating the body of a message from header components to arrive at the text body of a message. The words of a message are then searched in a lookup table that associates an activity with the presence or absence of words.

By way of example, a golfer may say or type a message communicating "Hi this is Clark Griswald. I want to book a tee-time at noon on January $24^{th}$." A search for "tee-time" enters a lookup table to produce a programmatic response that says "Do you want to book a tee time at noon on January $24^{th}$." If the answer in reply from the golfer is yes and the golfer is associated with only one golf course in the system 100, then it is known that sufficient key words are present 304 to arrive at a resolution, in which case the golf communications system 100 reports 308 from an automated scheduler to ascertain available tee-times at the golf course. The automated scheduler may be, for example, GolfSwitch™ by GolfSwich, Inc. of Scottsdale, Ariz., which may be a midlevel vendor in the vendor community 108 (see FIG. 1). If the answer is "No" or the golfer is associated with more than one golf course, then there is preprogrammed dialogue of menu options 308 for making tee time reservations. For example, the system 100 may determine that the golfer is associated with more than one golf course and inquire at which course the reservation should be made. If the text contains no keywords then the system 100 may be programmed to respond with a message such as "I did not understand that response. Do you wish to book a tee-time?" If the system 100 is able to determine the tee time and golf course, but not the USERID, the system 100 may ask the golfer to identify herself. It will be appreciated, however, that this type of inquiry may be avoided by using channel-appropriate lookup tables to identify, for example, a USERID that is associated with an email address, a messenger service ID, or an incoming phone number. This type of dialogue continues with logically programmed menu options 310 until a resolution is reached and the system 100 may report 306 from the automated scheduler.

This report either confirms the indicated tee time or, if that time is unavailable, communicates that fact and provides a range of options that are close in time to the indicated time. The system 100 places a temporary hold 312 on booking options for the available times and forms a query 314 from a library of predetermined queries, such as "We have no tee-times available at 1:00 pm on December 5. Would you like to book a time of 12:45 or 1:15?" These queries may reside anywhere on the system 100, but preferably reside on the master database 134 (see FIG. 1). This query is presented 316 to the golfer user for confirmation using that golfer's previously established omnichannel preferences. Once confirmed, arrangements are made for automated payment 318, which for example may be completed using the CardConnect® service described above. The tee-time is booked 320 using automated means, such as GolfSwitch™ described above, and the temporary hold of step 312 is removed 322 with synchronization of databases 112, 134 occurring to prevent double bookings of the same tee-times. As used herein, a "midlevel vendor" is a member of vendor community 108 that provides software as a service (SaaS) which is seamlessly integrated into the system 100 to an extent such that golfers do not need to purposefully access the SaaS.

Figure 4:
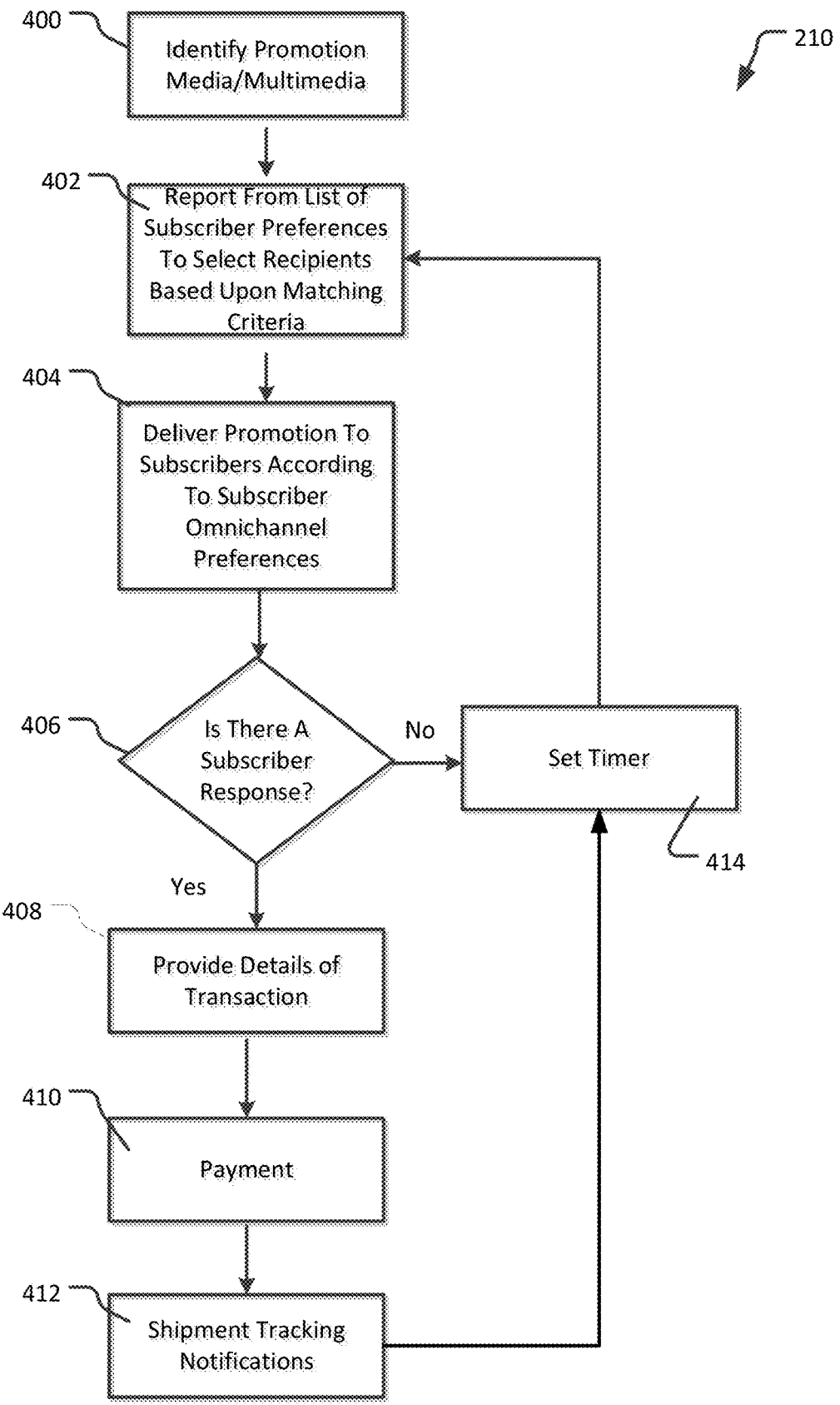
FIG. 4 is a flowchart of logic for program instructions providing a system functionality of conducting ecommerce transactions.

FIG. 4 shows program logic for the system functionality of ecommerce subscriptions 210 that may, for example, be programmed to reside on the central server 110. The system 100 periodically reports from the master database 112 to identify 400 a promotion or other media or multimedia presentation for a member of the vendor community 108. The system 100 reports 402 form a list of subscriber preferences to select recipients based upon matching criteria selected or provided by the vendor. This report may, for example, use search logic that selects golfer to receive a promotion for a restaurant where the individual golfers have indicated a preference to receive restaurant promotions, or to be notified of new restaurants that have opened within a ten mile radius of a particular golf course. Other preferences may include such things as preferences to know more about new golf equipment releases, golf vacations, golf resort promotions, hotels or cars that are marketed with a golf motif, travel, or group discounts that may be shared with fellow golfers among those who subscribe to the ecommerce community on system 100.

The promotion is then delivered 404 to the list of subscribers according to user-specified devices and omnichannel preferences. By way of example, the omnichannel preferences may be selected form options that include, among others, email, text (SMS), an Internet messaging service, voice, or any form of VoIP protocol messaging. For each subscriber, if there is a response 406 indicating a desire to complete a transaction, then the system 100 attends 408 to the usual transactional details, such as identification of the specific merchandise or service, identification of recipients, and delivery address as may be accomplished using any commercial payment service accepted by the vendor. Payment 410 is then tendered with interim shipment tracking notifications 412 being provided as needed. In order to avoid overworking the list of ecommerce subscribers, there is optionally but preferably the setting of a timer 414. This permits users to specify the temporal frequency of promotional messages, which may be used as a preference by the reporting logic of step 402. This timer may be also be set 414 immediately upon delivering the message in step 404 until such time as a response is received.

Figure 5:
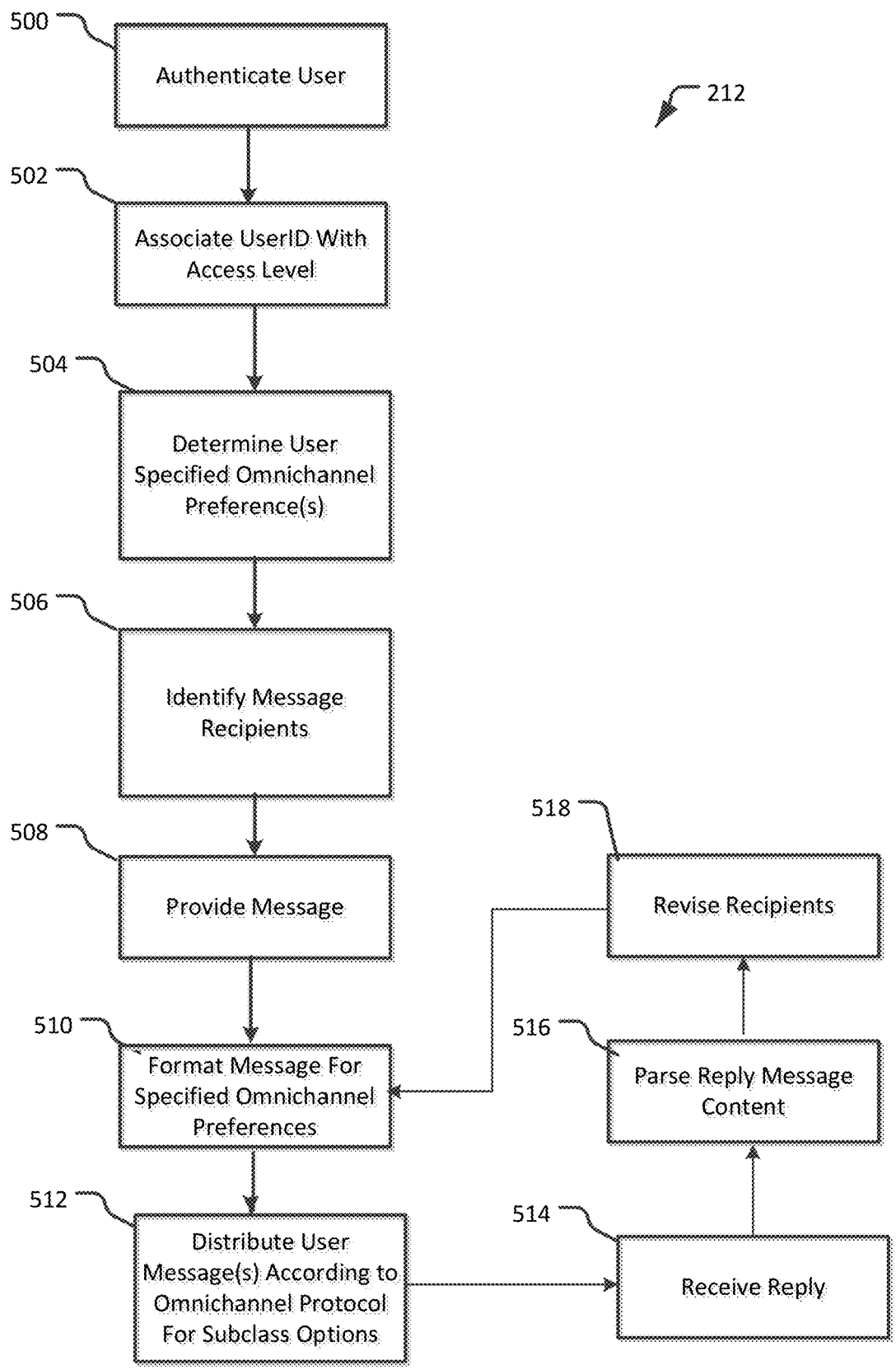
FIG. 5 is a flowchart of logic for program instructions providing a system functionality of providing communications among a party of golfers.

FIG. 5 shows program logic for the system functionality of other communications 212 that may, for example, be programmed to reside on the central server 110. Following user authentication 500, which may be for example a password or biometric authentication, the system 100 associates 502 the USERID with an access level and reports from database 112 to determine the user's omnichannel preferences. Different access levels may include, for example, the ability to send messages to individuals in a group of golfers, as opposed to sending messages to the entire group. The access level may restrict a golfer's ability to communicate with the pro shop for a particular golf course, or to communicate with other parties of golfers as a tournament is underway. The golfer then identifies 506 the message recipients and provides a message 508. The system 100 then formats 510 the message for transmission according to the omnichannel preferences that were determined in step 504. By way of example, the golf communications system 100 permits a golfer to create a user profile that specifies an omnichannel preference for email communications to a particular email account, as well as text communications to a particular mobile number. Another golfer may specify a preference to receive messages through Facebook Messenger™ and by voice mail. Yet another golfer may prefer to receive messages only by text (SMS).

The system 100 then distributes 512 the formatted message or messages to the intended recipients. The recipients may send reply messages, which the system 100 receives 514 and parses 516 to obtain the body of the message. The list of message recipients is revised to include those specified as recipients of the reply. The message body is then formatted 510 and distributed 512 to the intended recipients of the reply.

Figure 6:
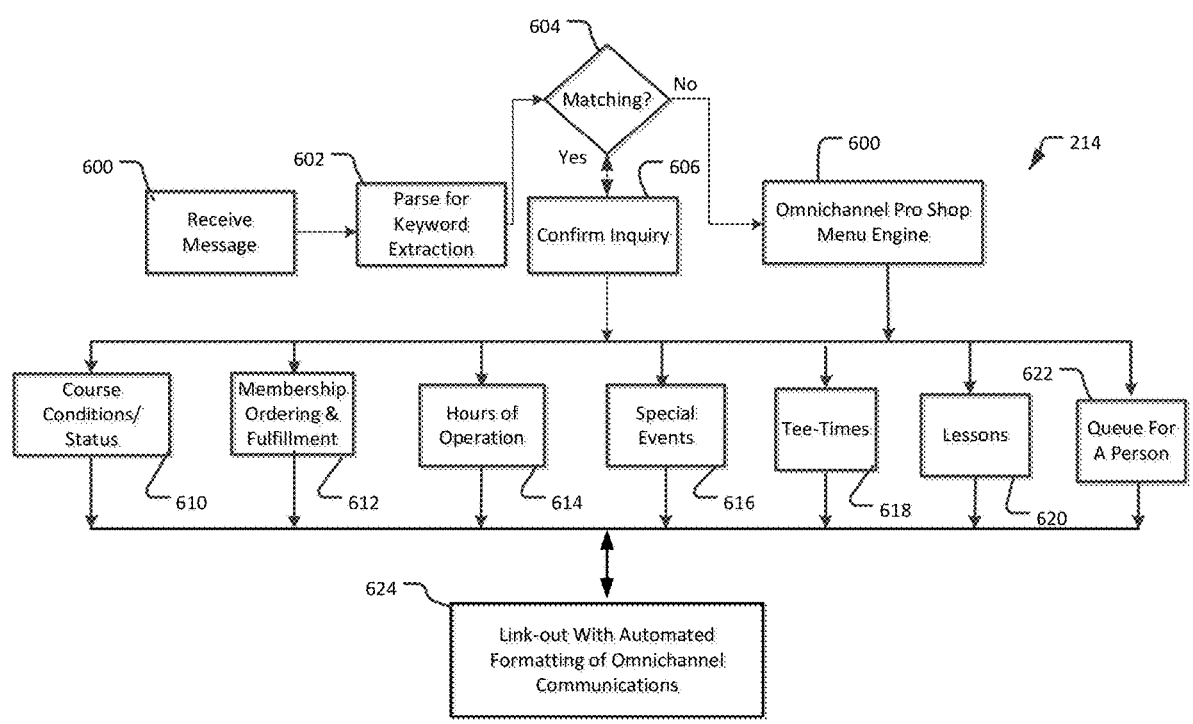
FIG. 6 is a flowchart of logic for program instructions providing a system functionality of a virtual pro shop.

FIG. 6 shows program logic for the virtual pro shop system functionality 214 that may, for example, be programmed to reside on the central server 110. The system 100 receives a message 600, which is parsed 602 for keyword extraction. The keywords are matched 604 in a lookup table that associates keywords with program instructions for access to the virtual pro shop according to predetermined options, the inquiry is confirmed. If sufficient keywords are present to form a match, then the inquiry is confirmed 606. For example, the system 100 may inquire of the golfer, "Do you wish to know conditions at the Suburban Golf Course?" Once confirmed 608, the golfer is routed to channel-appropriate messaging and menuing sub-blocks for additional communications, such as those for course conditions and status 610 which in addition to weather may include ancillary services such as ordering from a bar or restaurant, ecommerce ordering & fulfillment for system members 612, hours of operation 614, special event news 616, golf pricing options 618, lessons 620, and to be placed in a queue 622 to communicate with a person. Two-way user messaging 624 for the selected system functionality includes message translation for omnichannel use is provided according to established user preferences as described above.

By way of example, a golfer may use a mobile phone to call a number that has been assigned to a golf course. The golfer is, however, speaking with an interactive voice response subsystem of the cloud communications server 132 (see FIG. 1). The number is uniquely assigned to a particular golf course. A golfer calling that number hears three options, and is invited to select option 1, 2 or 3. The menu selection logic of this subsystem may be switched on and off, for example, to permit voice communications when staff at a pro shop are available to attend the phone, or to a nighttime configuration for use when all communications must be fully automated on the side of the pro shop. The switching of this nature may be done on a programmed schedule. The options may include, for example, pressing:

1 to "book a tee time with a faster check-in." This option gives the golfer option to book a tee time using a keypad or voice response as a prompt, with a computer generated voice prompting for input;
  2 to speak to a live person (golf course staff), or if the pro shop is closed to leave a message on a voicemail that course has set up on their own; and
  3 to hear golf course alerts.(computer generated response based on existing technology that transcribes text to voice).

The foregoing example utilizes a mobile phone, but the system 100 may accommodate the same substance and manner of communication using email, Internet messenger services, Internet chatrooms, text, or VoIP channels according to established user preferences. It will be appreciated that not all of these channels are amenable to use across all of the devices 138-148.

Figure 7:
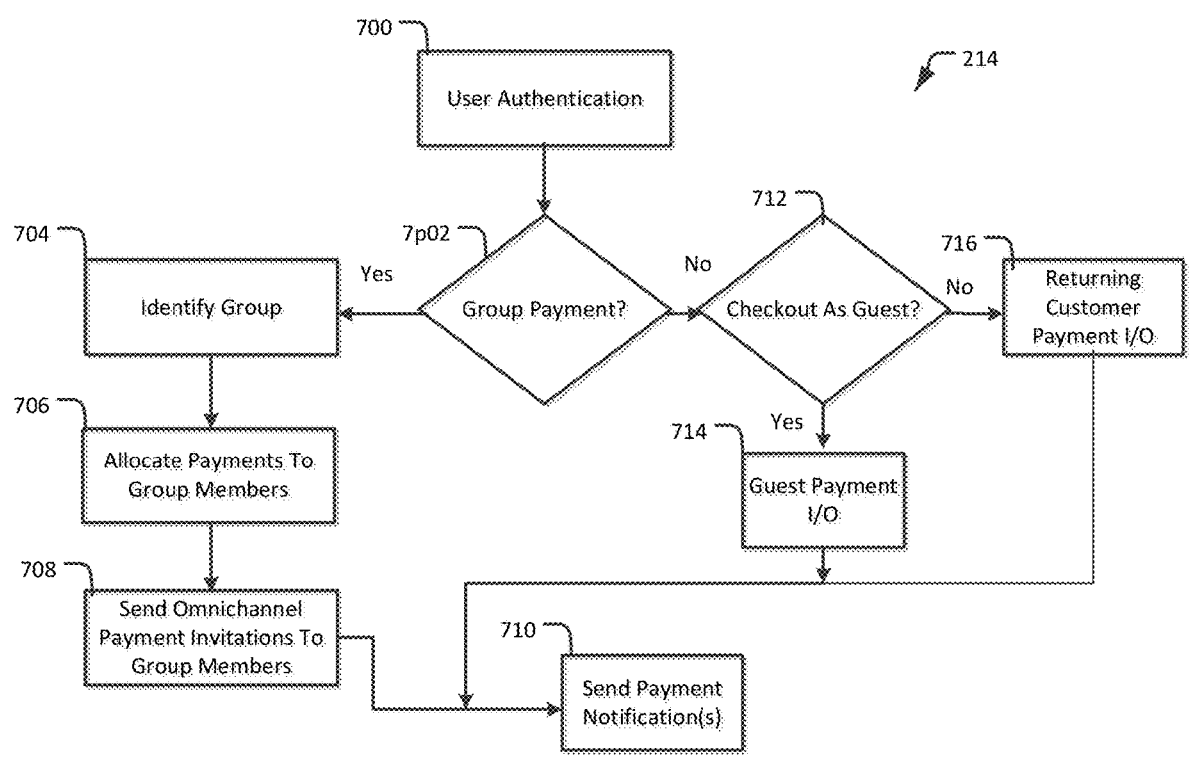
FIG. 7 is a flowchart of logic for program instructions providing a system functionality of payment options.

FIG. 7 shows program logic for the payment system functionality 214 that may, for example, be programmed to reside on the central server 110. According to various embodiments, the payment functionality 214 may be utilized to facilitate transactions in support of reservations 208, subscriptions 210, and the virtual pro shop 214 (see FIG. 1). When a user accesses the payment logic 214, there is first authentication 700 of the user to verify that the user is authorized to use the system 100 for payment and/or to access a commercial payment SaaS provider, such as Swipe™ described above. Authentication may occur, for example, using a password or biometric data.

The system 100 permits users to pay charges in groups. This means, for example, that a single golfer may book a tee-time for a party of four golfers, and allocate charges equally or unequally to all members of the group. Therefore, a threshold inquiry is whether this will be a group payment 702. If yes, then the user is asked to identify member of the group 704. One way of doing this is for the user to speak names into the phone with voice to text data conversion, reporting to look up an authorized name in the system, and prompting for the user to confirm each individual as an intended member of the group. Once the group is fully formed, the user is asked to allocate the payment 706 by dividing the overall payment into portions that are allocated to each member of the group. The allocation may be done according to an option where the charge is divided equally among the group members, or unequally as specified by the user. Thus, by way of example, a golfer may bring his nephew along at no charge to the nephew while paying a double portion of the overall charge, while each other member of the party pays a single portion. The system 100 then sends payment invitations 704 to the individual group members using omnichannel communications preferences as specified by each user. Notifications are then sent 710 to all group members confirming the fact of payment.

If the user elects not to make a group payment in step 702, then the system 100 inquires 712 whether the user would like to check out as a guest. If so, there is an exchange of input and output information 714 with the user as is customary in an electronic transaction, followed by sending notice to confirm the fact of payment 710. This may include, for example, and options to create a user account (not shown).

If the user elects not to check out as a guest in step 712, there is an exchange of returning customer input/output 716 as is customary for a returning customer in an electronic transaction, followed by sending notice to confirm the fact of payment 710.

Figure 8:
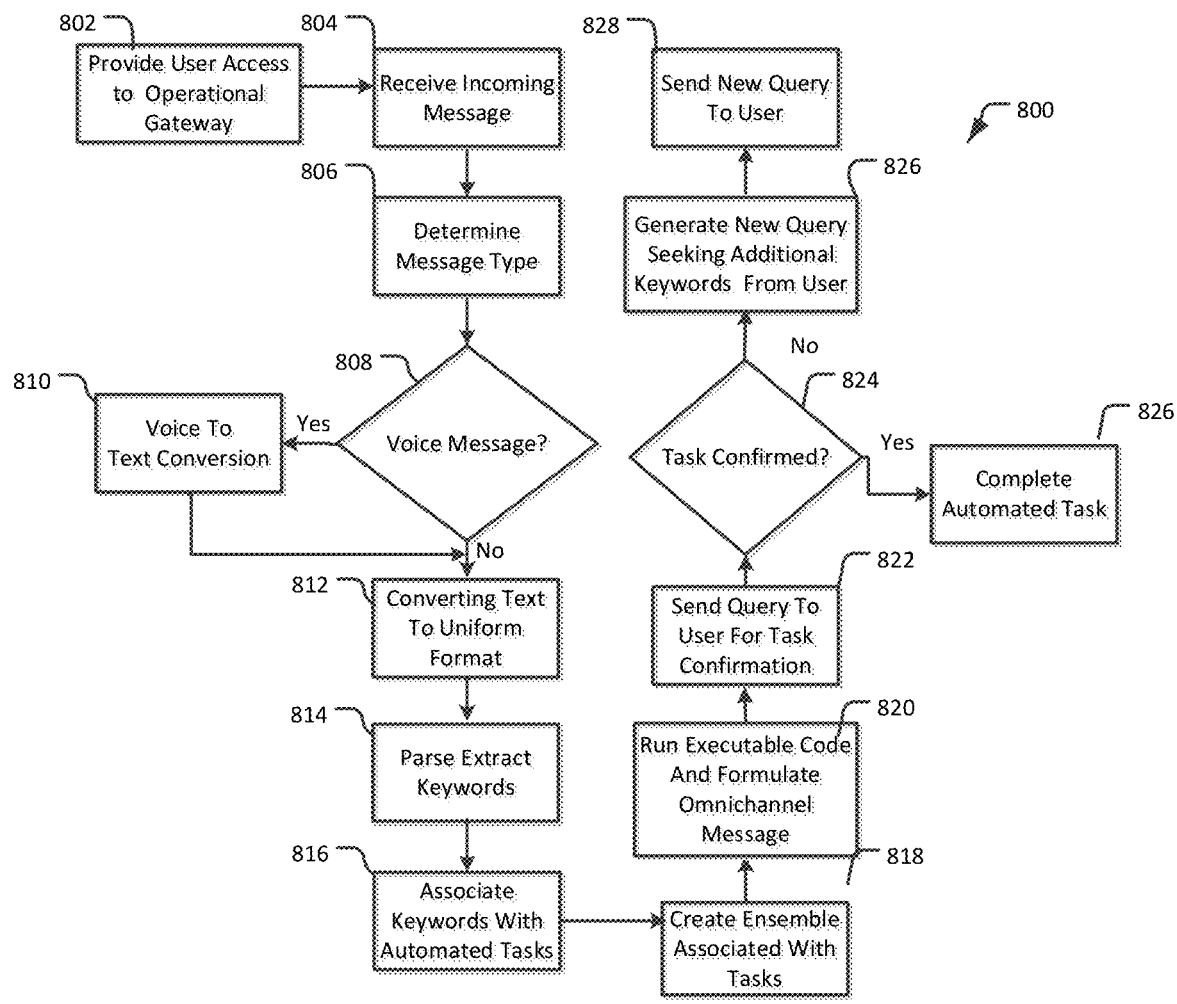
FIG. 8 is a flowchart of logic for program instructions for operation of a system gateway that enables omnichannel communications according to preferences established by each user.

A preferred aspect of the presently disclosed instrumentalities is to provide programmatic gatekeeping logic 800, as is shown in FIG. 8 according to one embodiment. This logic may reside on the central server 124, on the cloud communications service, or it may be distributed on the network comprising the system 100. A preferred option is to equip the cloud communications service 132 with program instructions implementing the gatekeeping logic 800.

Access may be provided 802 to an operational gateway by using a communications server that accepts incoming voice or VoIP telephone calls, as well as email and other forms of Internet messaging. The communications server may, for example, be provided with a telephone number on a bank of lines that accepts multiple incoming calls for this purpose. When the server receives 804 an incoming message, it determines 806 the message type. The message type may be, for example, a message in VoIP protocol, email, text (SMS), analog voice transmission, or that of an Internet messaging service. The system 100 inquires 808 whether the message is a voice communication and, if so, performs a voice to text conversion 810. This may be performed using various aspects of a commercial could communications service, such as Twilio™ as described above. The incoming message may then be converted 812 to uniform format, such as a flat text file that contains the body of the message. For those messages that are not voice messages, the conversion 812 may entail parsing the message to extract, for example, the body of a message by separating the same from other fields of VoIP or http protocol format packages and assembling the extracted components as a text message in a flat text file.

The extracted message is parsed 814 to extract keywords. The parsing may be done, for example, by comparing individual words or phrases in the message text to those in a lookup table ton identify matching instances. Once this occurs, there can then be an association of the keywords with automated tasks. For example, where the message identifies an individual, e.g., Clark Griswold, a tee time, and a clock time, logic may be provided to access a scheduler and look up tee time availability at the indicated time, and to place this information in a preformatted reply message constituting a dialogue with a golfer. There may be provided a database library of automated tasks based upon various combinations of keyword matching criteria towards this end. The program language with automated tasks may be combined to form an ensemble 818 of executable code components that formulate a reply 820 according to the golfer's omnichannel preferences. The reply message is sent 822 to the golfer, generally speaking, as a request to confirm 824 the activity. The activity may be, for example, the booking of a tee time, a payment, access to an ecommerce option, or a contact with the virtual pro shop according to the modalities described above. If the golfer confirms the task in reply, then the activity or task is completed 826 by use of the automated means described above.

If the golfer does not confirm the task at step 824, then the system 100 generates 826 a new query seeking additional keywords from the golfer. A query of this nature may be, for example, "I did not understand your request. Please restate it using different words. Do you wish to book a tee time?" The system 100 sends this new query 828 to the golfer and awaits a reply as a new incoming message 804.

The golf course service provider user community 106 includes people who have administrative access at different levels for the operations of one or more golf courses. This level of access permits them to do or undo anything that a golfer may do as described above. For example, an individual of the golf course service provider community 106 may be associate with a level of access permitting the individual to alter a booked tee-time for a particular party of golfers with communications towards this end being effectuated by the communications functionality of the API 206. Another level of access may permit an individual of this community to select which ecommerce offerings will be used in the ecommerce subscription service. Yet another level of access may permit an individual to refund or reallocate payments upon user request. Still yet another level of access may permit an individual to suspend or revoke system privileges if, for example, the individual receives notification that a golfer is using the system 100 to make abusive or otherwise threatening communications, is involved in illegal activity or is booking parties for tee times without their actual consent.

Figure 9:
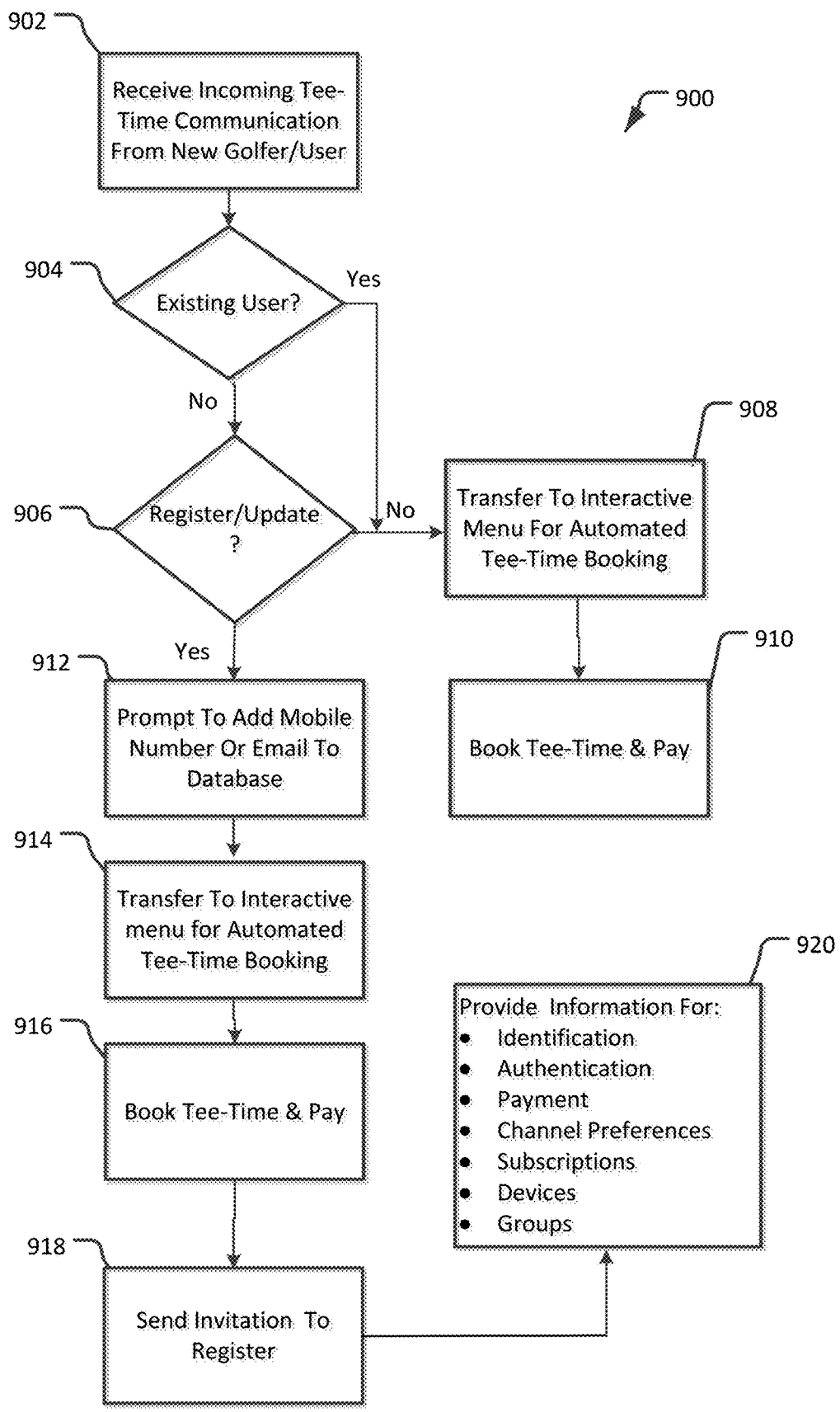
FIG. 9 is a flowchart of logic for program instructions for bookie ng a tee time while also registering a new user of the system.

FIG. 9 shows a process 900 of booking a tee-time reservation that may be implemented, for example, using program instructions to the tee-time system functionality 618 as shown in FIG. 6. For example, an IVR component of the cloud communications server may receive an incoming communication 902 which may be, for example, an email, voice communication, text (SMS) message, Internet messaging service communication, or Internet chatroom communication. The system 100 looks at data associated with the message to ascertain 904 whether the device or channel of communication in use by the golfer is registered in association with an existing user of the system. If so, the golfer is transferred 908 to an interactive menu for booking a tee-time. Once data exchange with the golfer is complete for that purpose, the system 100 books 910 the tee-time concomitantly with submission of payment.

If the device is not registered with the system 100, the system prompts the golfer whether to add the device or channel to the system. This may entail, for example, prompting to add a mobile number with preferences set to voice or text communications in association with the golfer. This may be done, alternatively, by prompting 912 to add an email address or any of the other channels identified above. The golfer may alternatively specify a combination of channels that will be used in tandem, such as voice, email, and text. Once the exchange of information is complete, the golfer is transferred 914 to an interactive menu for automated tee-time booking. This occurs as in step 908, except the golfer may be offered an incentive reward for registering with the system 100. The incentive reward may include, for example, a gift card to a restaurant, ecommerce incentives, or a discount off of any charges that are associated with booking a tee-time. Once data exchange with the golfer is complete for that purpose, the system 100 books 916 the tee-time concomitantly with submission of payment.

If the golfer is not an existing user or wishes to update registration information, The system 100 sends 918 the user a text, email or other communication inviting the golfer to complete the registration process. This is done by interaction with the golfer to provide 920 information that the system 100 uses as described above. Such information may include identifying information such as the golfer's name, address and public nickname. Use of a unique and memorable public nickname, such as "The Law," will facilitate group searching and identification for the communications purposes described above. Information for user authentication, such as a user password or biometric scan, may be provided, as well as payment information such as a credit card number, billing address, security code, and card expiration date. The golfer may be invited to specify preferences for devices and communications channels for use as described above. The golfer may be invited to subscribe to ecommerce offerings, and to specify the content or class of such offerings, as well as the frequency at which the system 100 provides these offerings. The golfer may be invited to identify other golfers on the system 100 in association as a group, and to specify allocations of payment among the group members.

Those of ordinary skill in the art will understand that the foregoing discussion teaches by way of example and not be limitation. Accordingly, what is shown and described may be subjected to insubstantial change without departing from the scope and spirit of invention. The inventors hereby state their intention to rely upon the Doctrine of Equivalents, if needed, in protecting their full rights in the invention.

We claim:

1. A golf communications system, comprising:
a central server that is in network communications with a plurality of servers respectively located at individual golf courses;
a cloud-based gateway programmed to function as a protocol translator to facilitate user communications with the central server and at least one of the plurality of servers, the protocol translator translating a protocol selected from a group of omnichannel communications options consisting of Voice-Over-Internet Protocol (VoIP), text messaging (SMS), an Internet messenger service, and combinations thereof;
the gateway being configured to process communications from the omnichannel communications options into a unified format that is sent to the central server; and
a plurality of golfer communications devices in network communications with the gateway and operably configured with program instructions for golfer-selectable omnichannel communications options facilitating tasks that include, in combination:
(a) golf tee time reservations;
(b) golf-related ecommerce subscriptions;
(c) communications among a party of golfers; and
(d) payments arising from user interaction with the foregoing items (a) and (b).

2. The golf communications system of claim 1, wherein there are a plurality of golfers classified by association as a group, and the program instructions for tee time reservations (a) permit a group representative to simultaneously reserve a tee time for a plurality of members of the group.

3. The golf communications system of claim 2, wherein the program instructions for payment (d) include program logic for allocating payments incurred as a result of reserving the tee time to individual golfers associated with the group.

4. The golf communications system of claim 3, wherein the payments are allocated equally among all of the individuals associated with the group.

5. The golf communications system of claim 3, wherein the payments are allocated non-equally among the individuals associated with the group.

6. The golf communications system of claim 1, wherein one of the golfer-selectable omnichannel communications options includes VoIP and another includes text (SMS) messaging.

7. The golf communications system of claim 6 wherein yet another of the golfer-selectable omnichannel communications options includes email.

8. The golf communications system of claim 6 wherein yet another of the golfer-selectable omnichannel communications options includes an Internet messaging service protocol.

9. The golf communications system of claim 1, wherein the gateway includes a telephone exchange operably configured to process VoIP and SMS data.

10. The golf communications system of claim 1, wherein the program instructions permit each individual user to specify a preference for at least one of the golfer-selectable omnichannel communications options.

11. The golf communications system of claim 1, wherein the program instructions for golf tee time reservations (a) and communications among a party of golfers (c) may be executed simultaneously from a user perspective.

12. The golf communications system of claim 1, wherein the program instructions for golf tee time reservations (a), communications among a party of golfers (c), and payments (d) may be executed simultaneously from a user perspective.

13. The golf communications system of claim 1, wherein the program instructions for golf tee time reservations (a), golf-related ecommerce subscriptions (b), communications among a party of golfers (c), and payments (d) may be executed simultaneously from a user perspective.

14. The golf communications system of claim 1, further comprising an applications program interface configured for input and/or output transactions facilitating the tasks including the golf tee time reservations (a), the golf-related ecommerce subscriptions (b), the communications among a party of golfers (c), and payments (d).

15. The golf communications system of claim 1, wherein the golf communications system further includes a database of code to perform a plurality of executable tasks;
   the gateway being programmed with logic to receive an incoming message;
   determine a message type of the incoming message according to one of the omnichannel communications options;
   convert the incoming message to a uniform format;
   parse the incoming message in the uniform format to extract keywords; and
   use the keywords to report from the database to assemble an ensemble of executable code components constituting the program instructions for the golfer-selectable omnichannel communications options.

* * * * *